(12) United States Patent
Lee (10) Patent No.: US 6,443,530 B1
(45) Date of Patent: Sep. 3, 2002

(54) WHEELS FOR BUGGY, STROLLER, CARRIAGE, TRICYCLE, DOLLY BUGGY, AND THE LIKE

(76) Inventor: Mei-Chen Lee, 2F., No.287, Fu Hsin Rd., San Hsia, Taipei Hsien (TW)

( * ) Notice: Subject to any disclaimer, the term of this patent is extended or adjusted under 35 U.S.C. 154(b) by 0 days.

(21) Appl. No.: 09/800,802

(22) Filed: Mar. 8, 2001

(51) Int. Cl.[7] .......................... B60B 7/04; B60B 23/00; A63H 17/26; A63H 17/00
(52) U.S. Cl. ................ 301/37.25; 301/111.01; 301/37.109; 446/448; 446/465
(58) Field of Search ................ 301/111.01, 111.04, 301/111.03, 37.25, 37.101, 37.108, 37.109; 446/236, 237, 238, 431, 448, 465, 469, 470, 489, 491

(56) References Cited

U.S. PATENT DOCUMENTS

| | | | | |
|---|---|---|---|---|
| 3,155,430 A | * | 11/1964 | Schindler | 301/37.25 |
| 5,938,294 A | * | 8/1999 | Chan | 301/111.01 |
| 5,957,544 A | * | 9/1999 | Hu | 280/47.38 |

* cited by examiner

*Primary Examiner*—S. Joseph Morano
*Assistant Examiner*—Jason R. Bellinger
(74) *Attorney, Agent, or Firm*—Varndell & Varndell, PLLC (57) ABSTRACT

A vehicle wheel ideal for buggy, stroller, carriage, tricycle, dolly buggy, and the like, having a wheel rim mounted on a wheel axle and holding an outer tire, movable parts mounted on an inner table suspended in the wheel rim, and a cartoon-Figured wheel cover fixedly fastened to the inner table. When the vehicle goes forward, the cartoon Figured wheel cover doesn't move at all, on the contrary, the Figure's eyes, nose, and ears start to swing.

2 Claims, 13 Drawing Sheets

Fig. 10 though the center of the wheel rim 1, the

WHEELS FOR BUGGY, STROLLER, CARRIAGE, TRICYCLE, DOLLY BUGGY, AND THE LIKE

BACKGROUND AND SUMMARY OF THE INVENTION

The present invention relates to vehicle wheels ideal for buggy, stroller, carriage, tricycle, dolly buggy, and the like, and more particularly, to such a vehicle wheel, which has an attractive and active appearance with rocking nose/eyes/ears.

A variety of vehicles including buggies, strollers, carriages, tricycles, dolly buggies, and etc., have been disclosed for babies and young children. The wheels of these vehicles commonly made detachable. There are also known vehicle wheels with decorative designs. However the decorative designs look vague during rotation of the vehicle wheels.

It is one object of the present invention to provide a vehicle wheel, which is detachable. It is another object of the present invention to provide a vehicle wheel, which is ideal for buggies, strollers, carriages, tricycles, dolly buggies, and the like. It is still another object of the present invention to provide a vehicle wheel, which has an attractive and active appearance with rocking nose/eyes/ears. According to one aspect of the present invention, the vehicle wheel comprises a wheel rim mounted on a wheel axle and holding an outer tire, movable parts mounted on an inner table suspended in the wheel rim, and a cartoon-Figured wheel cover fixedly fastened t the inner table. When the vehicle goes forward, the cartoon Figured wheel cover doesn't move at all, on the contrary, the Figure's eyes, nose, and ears start to swing. According to another aspect of the present invention, quick release means is provided to secure the wheel rim, the inner table, and the wheel cover to the wheel axle, enabling the wheel rim, the inner table and the wheel cover to be easily detached from the wheel axle.

DETAILED DESCRIPTION OF THE PREFERRED EMBODIMENT

Referring to Figures from 1 through 10, a vehicle wheel in accordance with the present invention is generally comprised of a wheel rim 1, an inner table 2, two stop plates 31, a spring wire rod 32, two driving arms 33, a press member 34, a compression spring 35, a wheel cover 4, and a wheel axle 5.

Figure 2A:
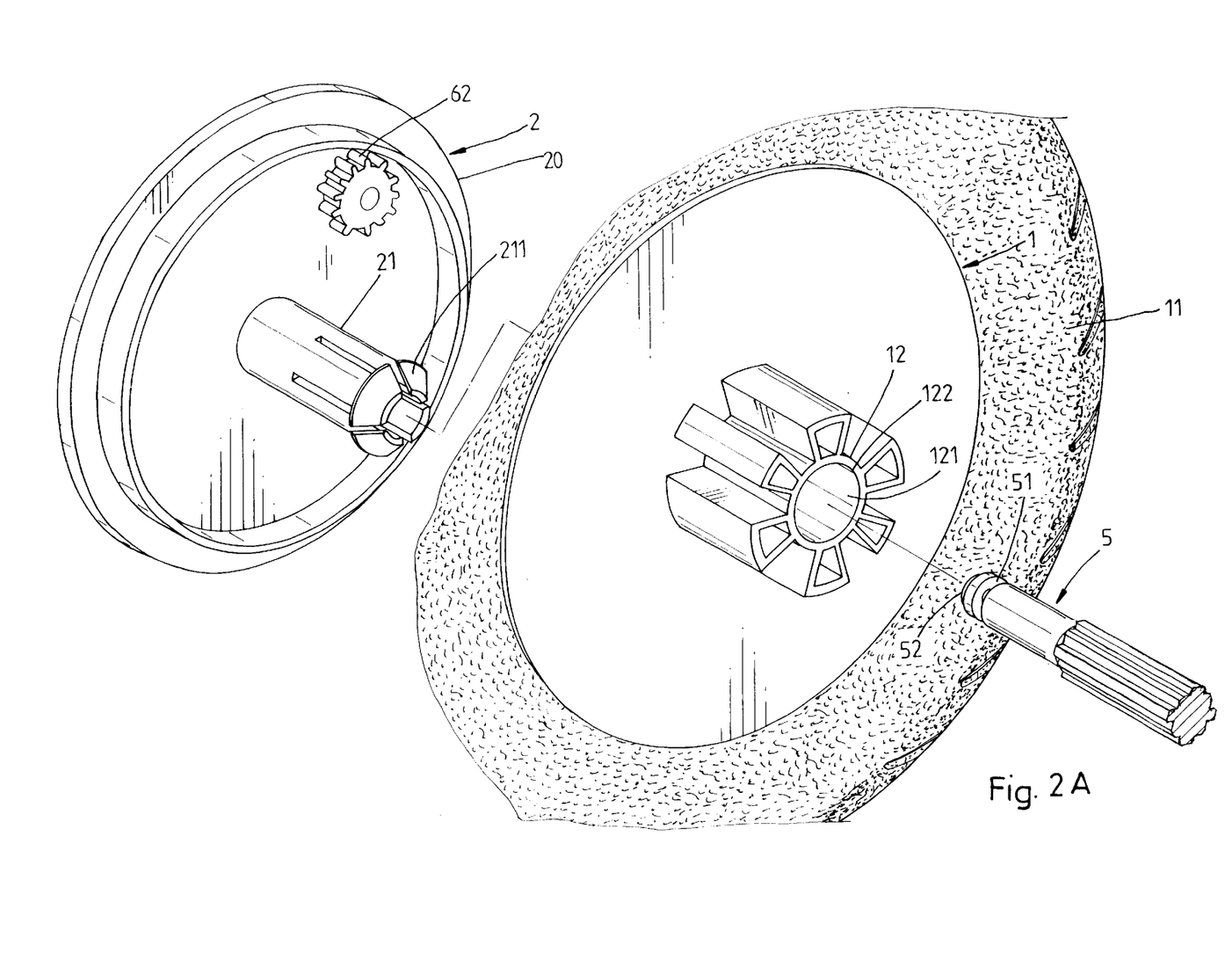
FIG. 2A is another exploded view of the vehicle wheel when viewed from another angle.
Figure 2B:
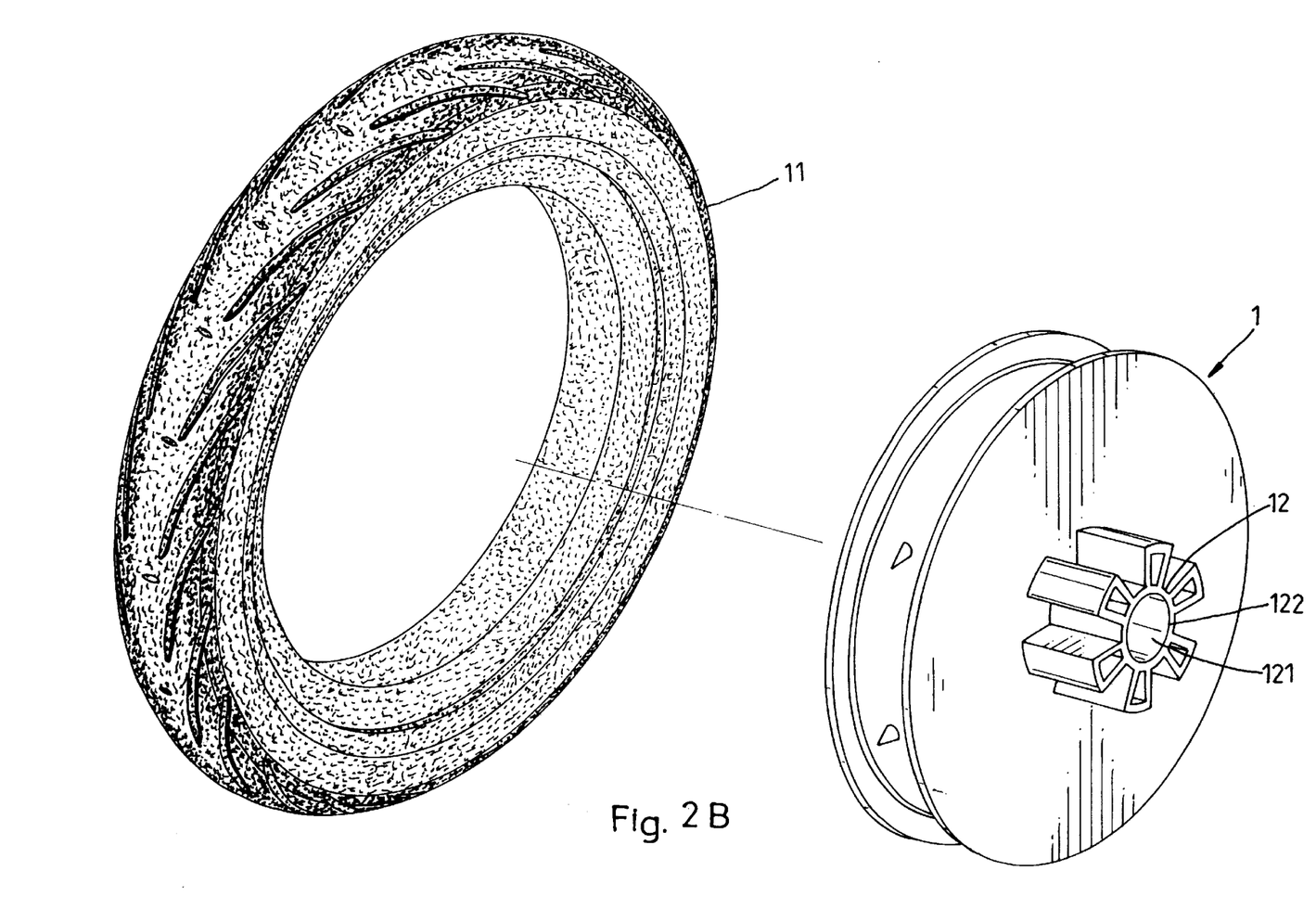
FIG. 2B is an exploded view of the wheel rim and the outer tire according to the present invention.
Figure 2C:
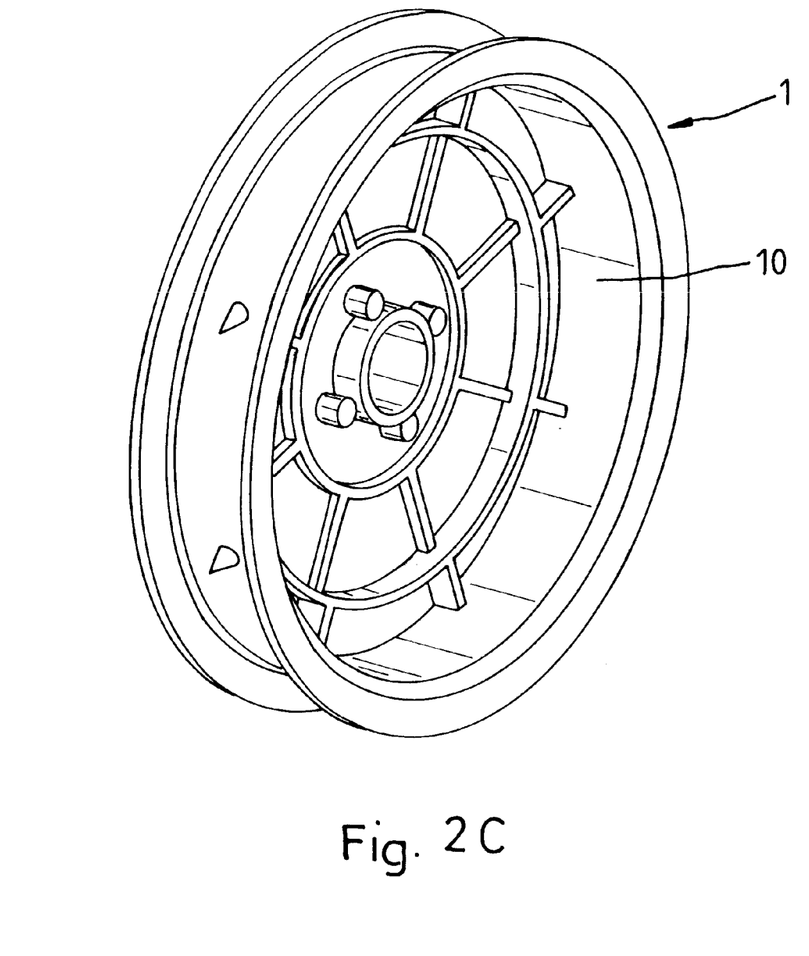
FIG. 2C is an oblique elevation of the wheel rim according to the present invention.
Figure 3:
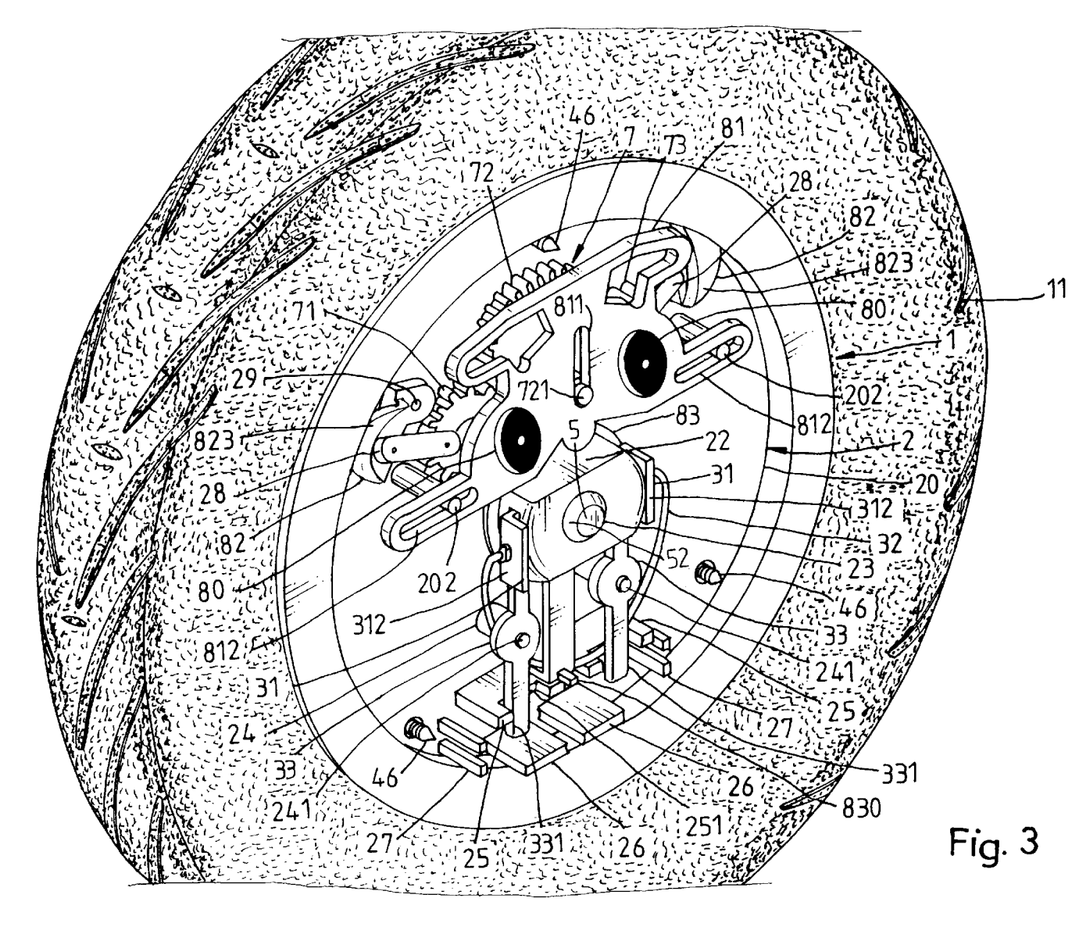
FIG. 3 is an assembly view of FIG. 1.
Figure 4:
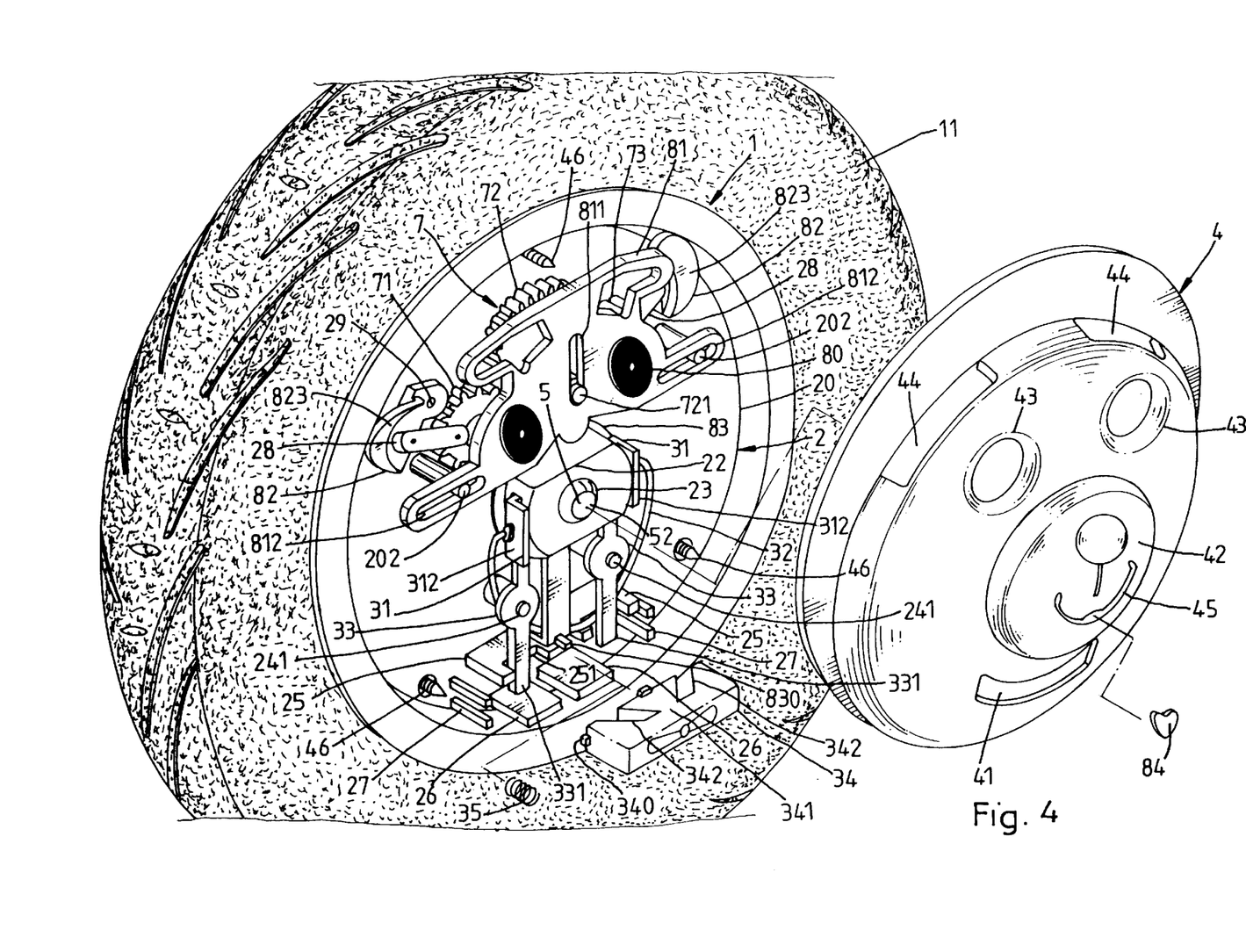
FIG. 4 shows the relationship between the wheel cover and the assembly of the other parts of the vehicle wheel according to the present invention.
Figure 5:
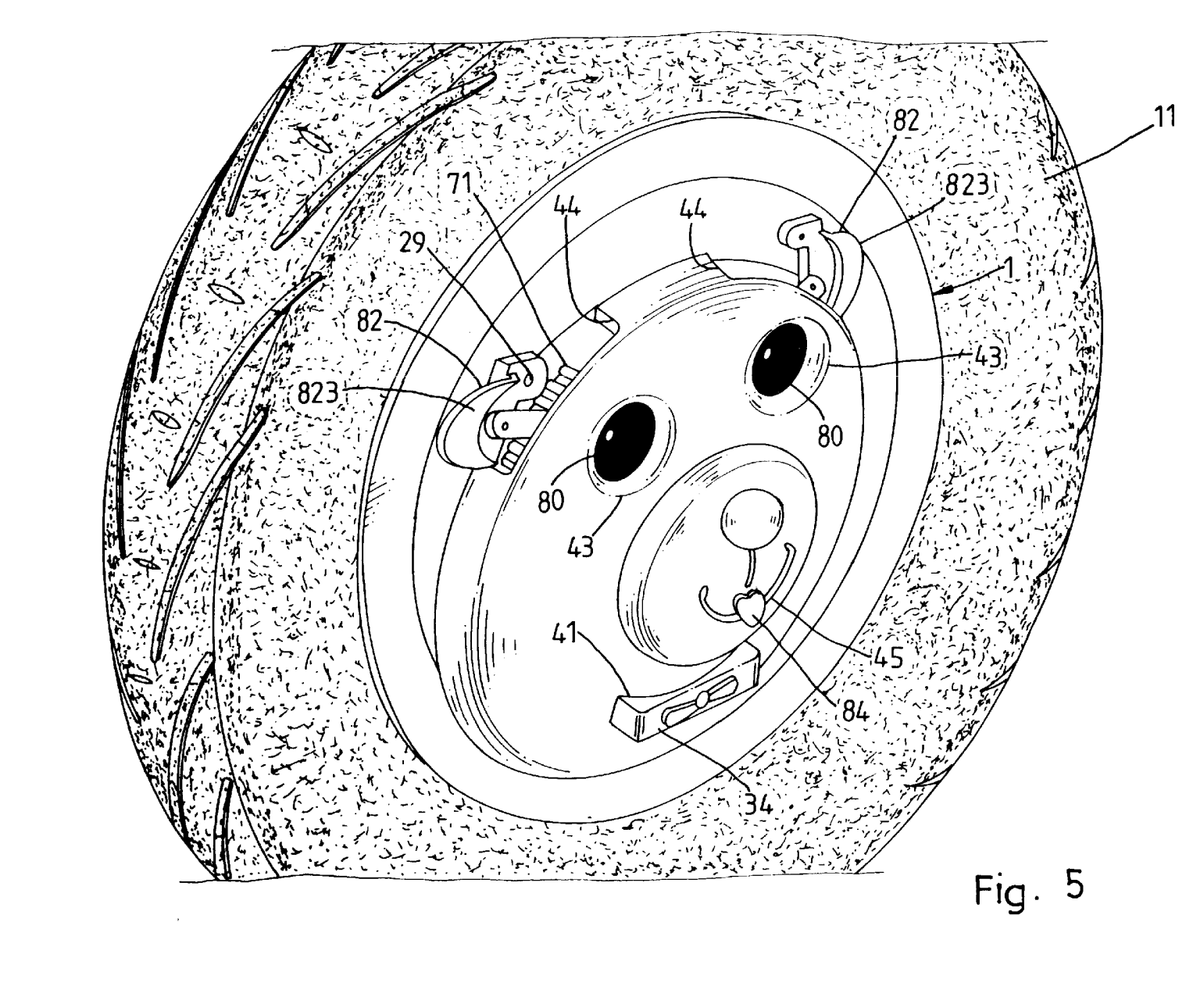
FIG. 5 is an assembly view of FIG. 4.
Figure 6A:
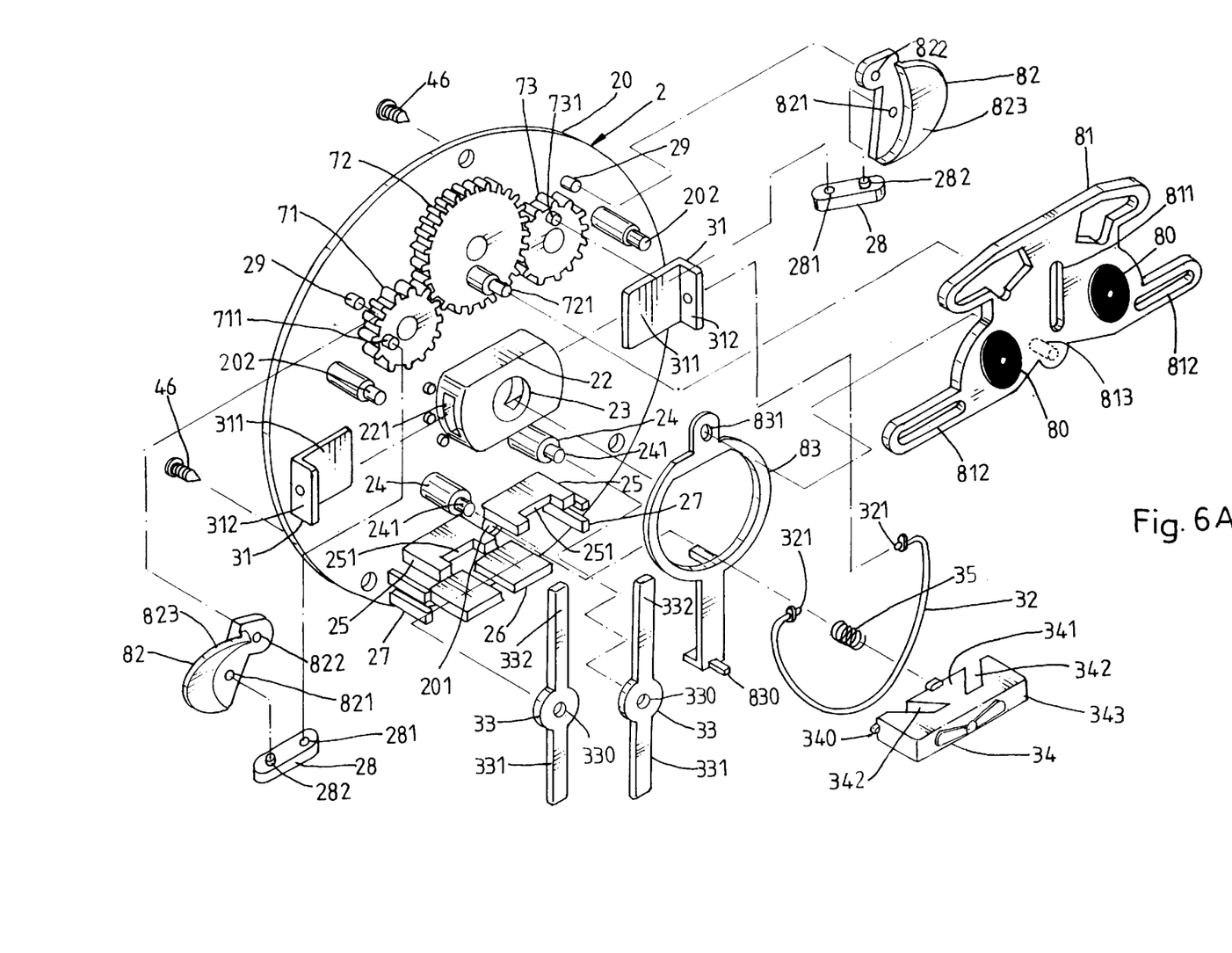
FIG. 6A is an exploded view of the inner table, the ornamental devices, the press member, the spring wire rod, the stop plates, and the driving arms according to the present invention.
Figure 6B:
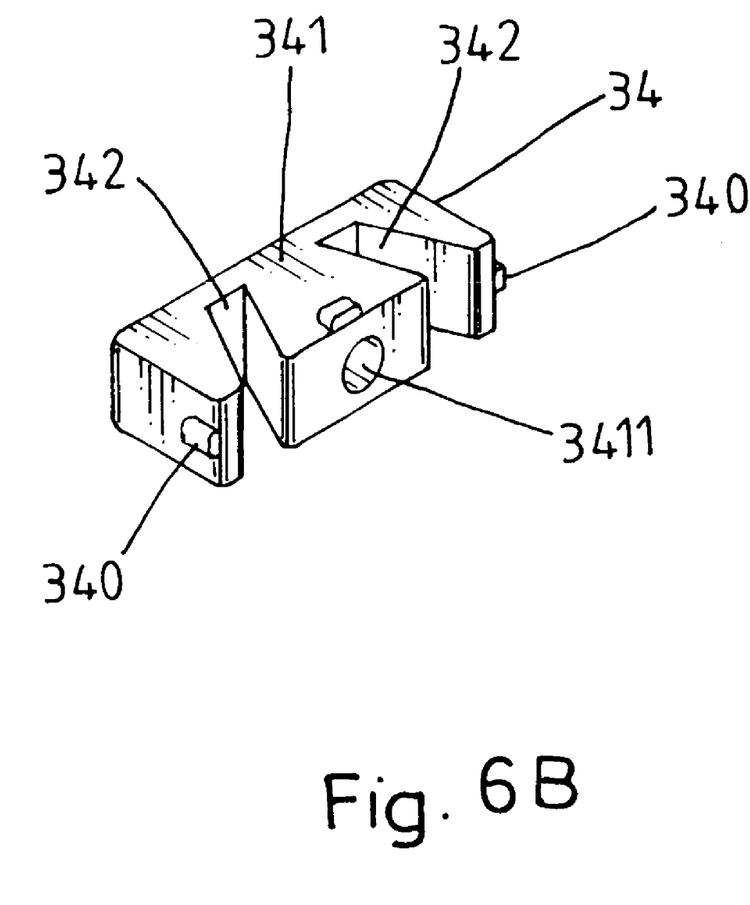
FIG. 6B is an oblique elevation of the press member according to the present invention.
Figure 7:
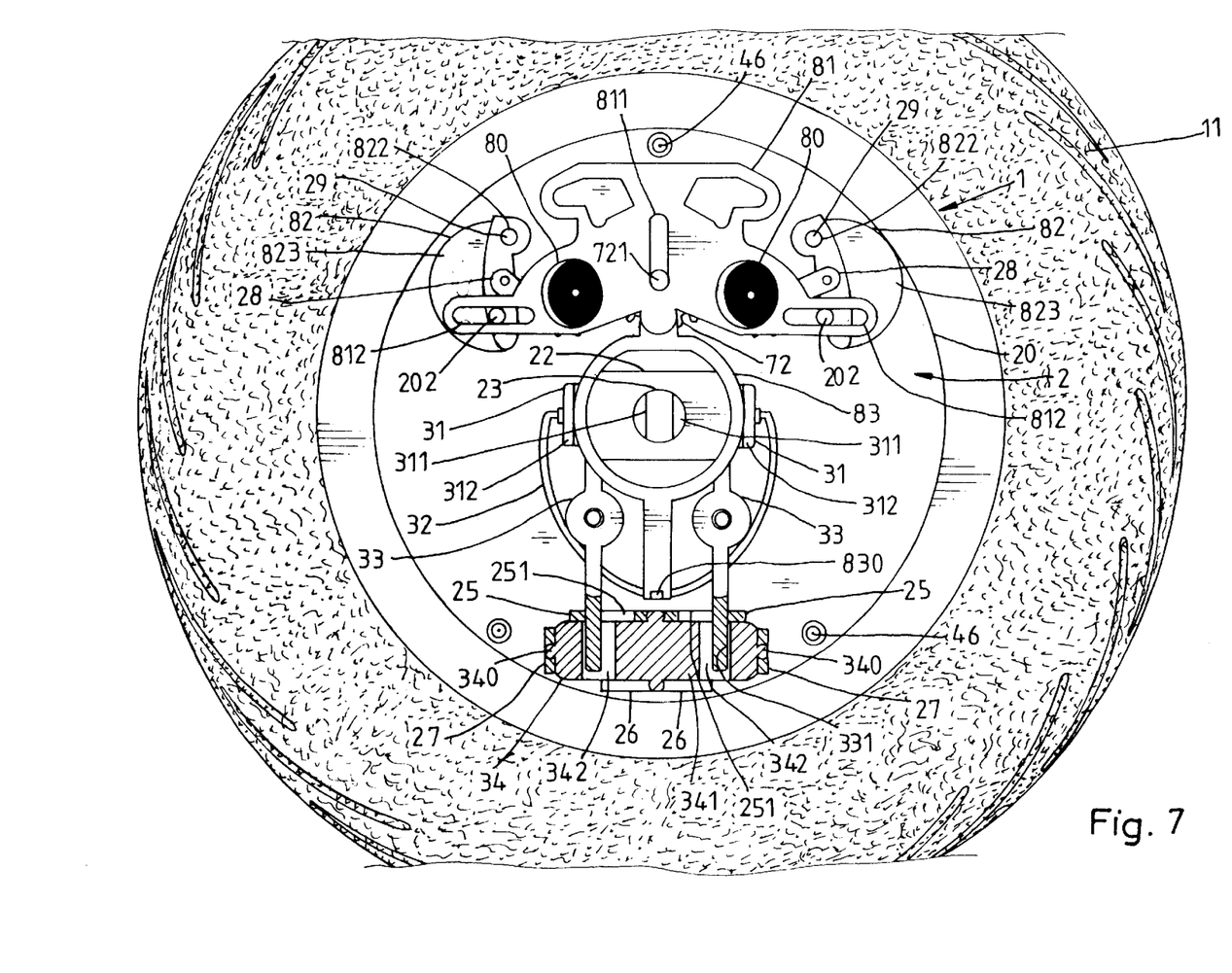
FIG. 7 is a front view of the vehicle wheel before the installation of the wheel cover and the wheel axle according to the present invention.
Figure 8:
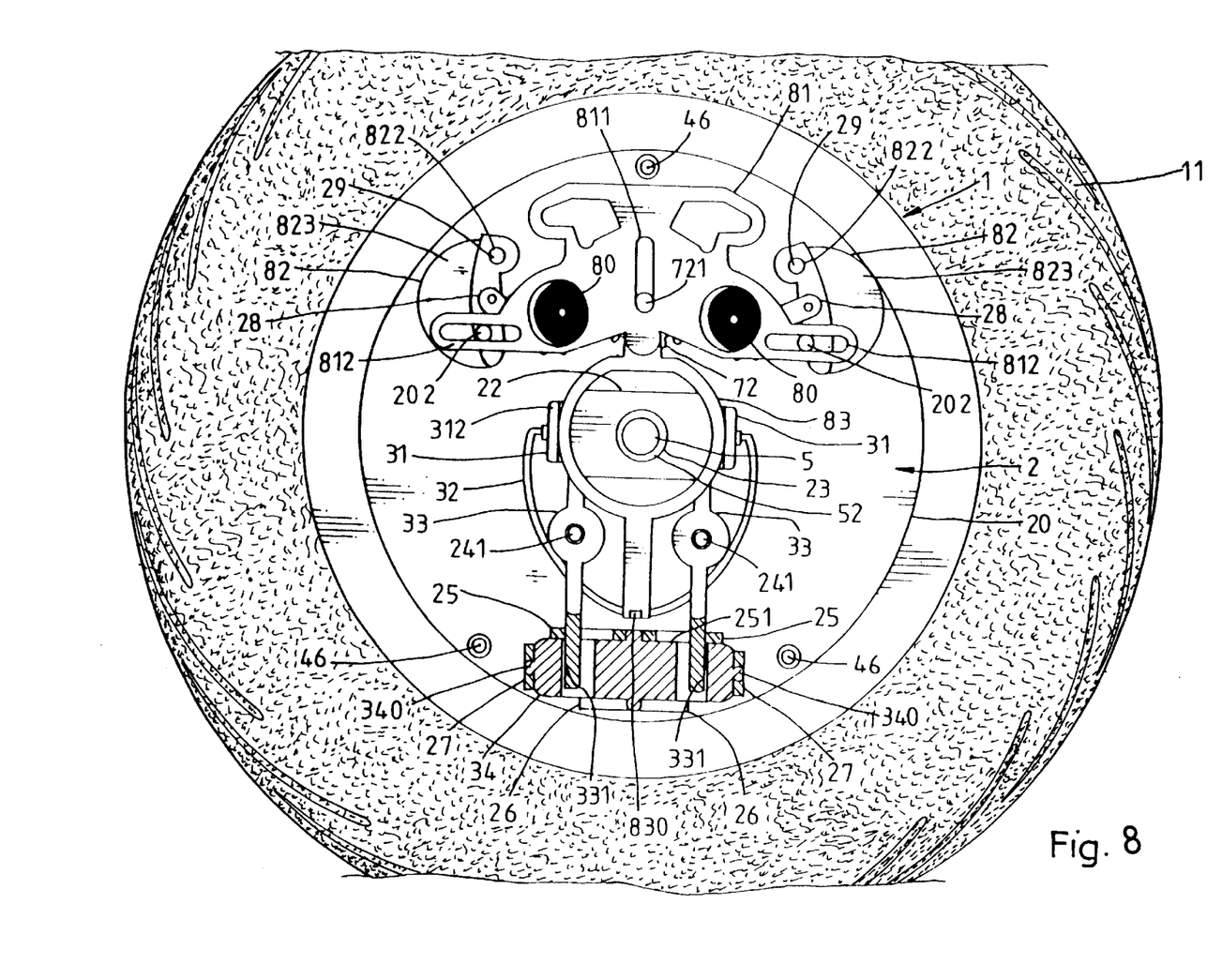
FIG. 8 is similar to FIG. 7 but showing the wheel axle installed.
Figure 9:
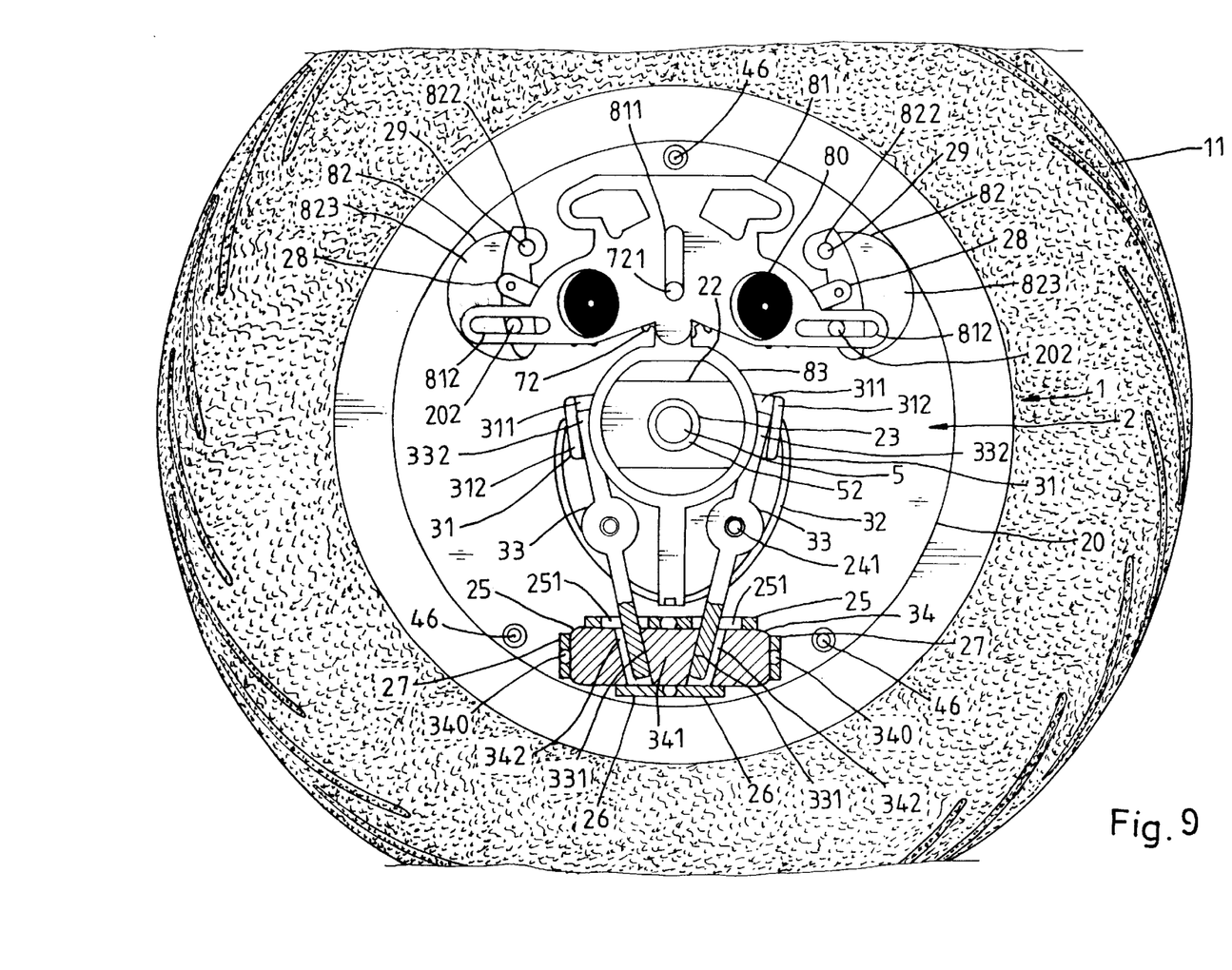
FIG. 9 is a plain view of the present invention, showing the press member depressed.
Figure 10:
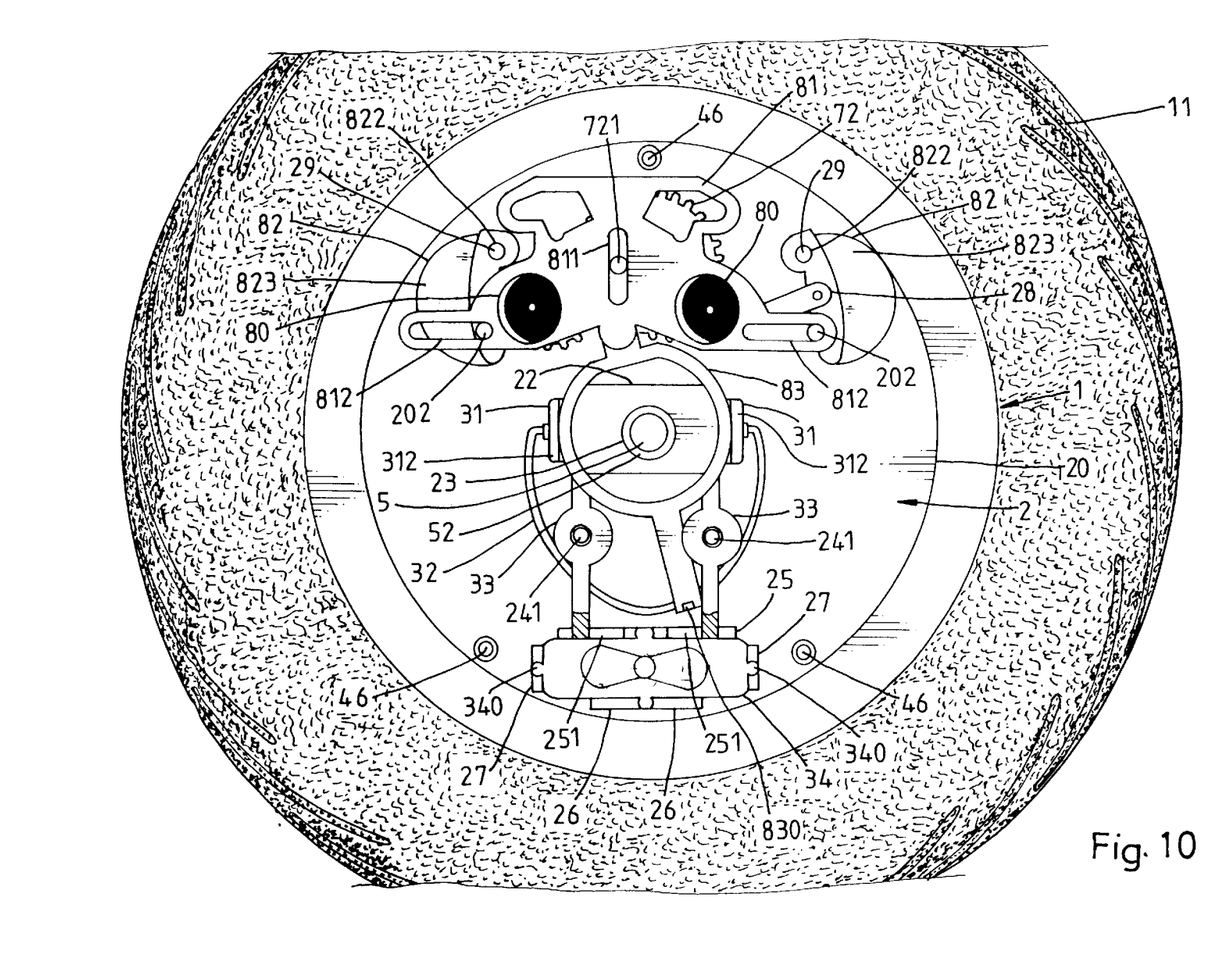
FIG. 10 is similar to FIG. 8 but showing the ornamental devices moved.

The wheel rim 1 holds an outer tire 11, comprising a center axle holder 12 extended from one sidewall thereof (see FIG. 2), a circular center recess 10 disposed at the other sidewall thereof, and a center through hole 121 axially extended through the center of the center axle holder 12 and the center of the circular center recess 10.

The inner table 2 comprises a flat circular body 20 mounted in the circular center recess 10 of the wheel rim 1, a stem 21 perpendicularly extended from the center of the inner sidewall of the flat circular body 20 and inserted through the center through hole 121 of the wheel rim 1, the stem 21 having a split, flanged retaining head 211 secured to the end edge 122 of the axle holder 12 of the wheel rim 1, an axle holder 22 disposed at the center of the outer sidewall of the flat circular body 20 (see FIG. 6A), the axle holder 22 having two side holes 221 aligned at two sides and adapted to receive the stop plates 31, a center through hole 23 axially extended through the center of the stem 21 and the center of the axle holder 22 in communication with the side holes 221, two pivot shafts 24 perpendicularly extended from the outer sidewall of the flat circular body 20 and disposed at one side relative to the axle holder 22, the pivot shafts 24 each having a top round rod 241 adapted to hold the driving arms 33, two first upright locating plates 25 perpendicularly extended from the outer sidewall of the flat circular body 20 and spaced from the pivot shafts 24 at one side opposite to the axle holder 22, the first upright locating plates 25 each having a top notch 251 adapted to receive one end 331 of each of the driving arms 33 and to limit swinging angle of the driving arms 33, two second upright locating plates 26 perpendicularly extended from the outer sidewall of the flat circular body 20 near the border, two symmetrical pairs of guide rods 27 perpendicularly extended from the outer sidewall of the flat circular body 20 at two sides of the upright locating plates 25 and 26 and adapted to guide movement of the press member 34, and a recessed hole 201 formed on the outer sidewall of the circular flat body 20 at the center of the space surrounded by the upright locating plates 25 and 26 and the guide rods 27.

The stop plates 31 are angled plates each comprising a horizontal section 311 inserted through one side hole 221 of the axle holder 22 of the inner table 2 into the center through hole 23 of the inner table 2, and a vertical section 312 (see FIG. 7) disposed in contact with one end 332 of one driving arm 33 at one side.

The spring wire rod 32 is a substantially U-shaped metal wire rod stopped against the first upright locating plates 25 at one side, having two ends 321 respectively fastened to the vertical section 312 of each of the stop plates 31 to force the stop plates 31 toward the center of the center through hole 23 of the inner table 2.

The driving arms 33 are respectively coupled to the pivot shafts 24 of the inner table 2, each having a center pivot hole 330, which receives the round rod 241 of the corresponding pivot shaft 24, a first end 331 suspending in the top notch 251 of one first upright locating plate 25 and a second end 332 stopped at an inner side of the vertical section 312 of one stop plate 31.

The press member 34 is inserted into the space between the first upright locating plates 25 and the second upright locating plates 26, comprising a dovetailed bottom block 341, the dovetailed bottom block 341 has a recessed bottom hole 3411 (see FIG. 6B), two oblique bottom guide grooves 342 disposed at two sides of the dovetailed bottom block 341 and respectively coupled to the first end 331 of each of the driving arms 33, a top press face 343 for pressing with the hand, and two protruded portions 340 disposed at two sides and adapted to stop the press member 34 from escaping out of the constraint of the wheel cover 4.

The compression spring 35 has one end press-fitted into the recessed bottom hole 3411 of the dovetailed bottom block 341 of the press member 34, and the other end positioned in the recessed hole 201 of the flat circular body 20 of the inner table 2.

The wheel cover 4 is shaped like a cartoon figure (the shape of the face of a rat, cow, tiger, rabbit, horse, goat, monkey, chicken, dog, lion, pig, bear, or the like) and fixedly fastened to the inner table 2 by fastening means, for example, screws 46, having a button hole 41 adapted to receive the press member 34 for enabling the user to press the press face 343 of the press member 34 with the hand.

The wheel axle 5 is fixedly fastened to the frame body of the vehicle (not shown) and inserted through the center through hole 121 of the center axle holder 12 of the wheel rim 1 and the center through hole 23 of the inner table 2, having a conical outer end 52 and an annular retaining groove 51 disposed around the periphery adjacent to the tapered outer end 52.

When inserting the wheel axle 5 into the center through hole 121 of the center axle holder 12 of the wheel rim 1 and the center through hole 23 of the inner table 2, the stop plates 31 are pushed outwards in reversed directions against the spring power of the spring wire rod 32 by the conical outer end 52 of the wheel axle 5. After the wheel axle 5 has been inserted into position, the stop plates 31 are forced inwards by the spring wire rod 32 to engage the annular retaining groove 51 of the wheel axle 5 (see FIG. 8). When pressing down the press member 34, the driving arms 33 are forced by the press member 34 to turn about the pivot shafts 24 reversely outwards from the axle holder 22 of the inner table 2 and to push the stop plates 31 away from the annular retaining groove 51 of the wheel axle 5 (see FIG. 9), for enabling the inner table 2 and the wheel rim 1 to be removed from the wheel axle 5. Because the wheel cover 4 is not rotated with the wheel rim 1 and the outer tire 11, the design of the wheel cover 4 is constantly maintained immovable during the movement of the vehicle.

Figure 1:
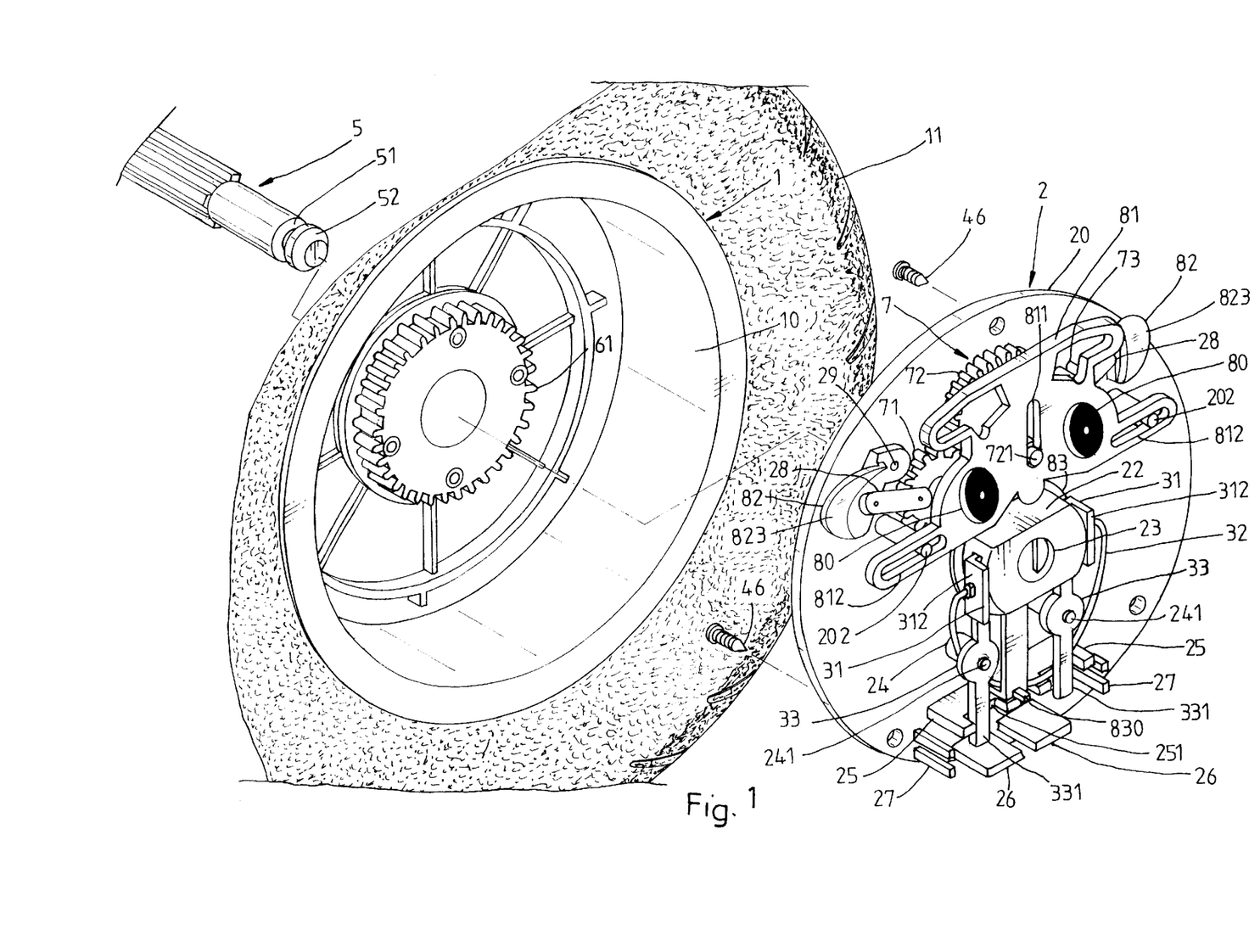
FIG. 1 is an exploded view of a vehicle wheel according to the present invention (the wheel cover excluded).

An annular drive gear 61 is provided in the circular center recess 10 around the center through hole 121 of the wheel rim 1 (see FIG. 1). A driven gear 62 is provided at the inner sidewall of the flat circular body 20 of the inner table 2 (see FIG. 2A) and meshed with the drive gear 61. A transmission gear train 7 is mounted on the outer sidewall of the flat circular body 20 of the inner table 2 and driven by the driven gear 62 to move a first ornamental device 81, two second ornamental devices 82, a third ornamental device 83, and a fourth ornamental device 84. The transmission gear train 7 comprises a first small gear 71, a second small gear 73, and a big gear 72 meshed between the small gears 71 and 72. The first small gear 71 is rotated with the driven gear 62. The gears 71, 72, and 73 each have an eccentric rod 711, 721, or 731. The third ornamental device 83 is hung on and turned about the axle holder 22 of the inner table 2, comprising a pivot hole 831 disposed at one end thereof, and a protruding rod 830 disposed at an opposite end thereof and inserted into an arched slot 45 of the wheel cover 4. The first ornamental device 81 comprises an elongated, vertically extended middle slot 811 coupled to the eccentric rod 721 of the big gear 72, two elongated, horizontally extended side slots 812 respectively coupled to a respective stepped post 202 of the inner table 2, and a back pin 813 inserted into the pivot hole 831 of the third ornamental device 83. Two links 28 are coupled between the second ornamental devices 82 and the small gears 71 and 73. The links 28 each have a pivot hole 281 disposed near one end and coupled to the eccentric rod 711 or 731 of one small gear 71 or 73, and a pivot rod 282 disposed near the other end and coupled to one second ornamental device 82. The second ornamental devices 82 each comprises a first pivot hole 821 coupled to the pivot rod 282 of one link 28, a second pivot hole 822 coupled to a respective pivot rod 29 of the inner table 2 (see FIG. 4), and an ear-like lug 823 extending out of a respective opening 44 of the wheel cover 4 (see FIG. 5). In addition to the aforesaid button hole 41, openings 44, and arched slot 45, the wheel cover 4 further comprises a nose 42 disposed above the arched slot 45, and two eyeholes 43 bilaterally disposed above the nose 42. The fourth ornamental device 84 is shaped like the tongue of an animal and fixedly fastened to the protruding rod 830 of the third ornamental device 83 outside the wheel cover 4. Further, two eye-shaped stickers 80 are adhered to the first ornamental device 81 at locations corresponding to the eyeholes 43 of the wheel cover 4. During movement of the vehicle, the drive gear 61 is rotated with the wheel rim 1 to move the driven gear 62 and then the transmission gear train 7. During rotary motion of the gears 71, 72 and 73 of the transmission gear train 7, the first ornamental device 81 is driven by the eccentric rod 721 of the big gear 72 to move back and forth on the stepped posts 202 of the inner table 2, and the third ornamental device 83 is driven by the back pin 813 to oscillate on the axle holder 22 of the inner table 2, causing the tongue-like fourth ornamental device 84 to be moved with the protruding rod 830 of the third ornamental device 83 back and forth along the arched slot 45 of the wheel cover 4. At the same time, the links 28 are forced by the eccentric rods 711 and 731 of the small gears 71 and 73 to swing, simulating the swinging of the ears of an animal.

A prototype of vehicle wheel has been constructed with the features of FIGS. 1~10. The vehicle wheel functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A vehicle wheel comprising:

a wheel axle fixedly fastened to the frame body of a vehicle, said wheel axle having tapered outer end and an annular retaining groove disposed around the periphery thereof adjacent to said tapered outer end;

a wheel rim mounted on said wheel axle and holding an outer tire, said wheel rim comprising a center axle holder extended from one sidewall thereof, a circular center recess disposed at an opposite sidewall thereof, and a center through hole axially extended through the center of the center axle holder of said wheel rim and the center of said circular center recess and coupled to said wheel axle for enabling said wheel rim to be rotated on said wheel axle;

an inner table fastened to said wheel axle and suspended in the circular center recess of said wheel rim, said inner table comprising a stem perpendicularly extended from the center of an inner sidewall thereof and inserted through the center through hole of said wheel rim, said stem having a split, flanged retaining head stopped outside the axle holder of said wheel rim, an axle holder disposed at the center of an outer sidewall thereof, the axle holder of said inner table having two side holes aligned at two sides, a center through hole axially extended through the center of said stem and the center of the axle holder of said inner table in communication with said side holes, two pivot shafts perpendicularly extended from the outer sidewall of said inner table and disposed at one side relative to the axle holder of said inner table, the pivot shafts of said inner table each having a top round rod, two first upright locating plates perpendicularly extended from the outer sidewall of said inner table and spaced from the pivot shafts of said inner table at one side opposite to the axle holder of said inner table, said first upright locating plates each having a top notch, two second upright locating plates perpendicularly extended from the outer sidewall of said inner table, two symmetrical pairs of guide rods perpendicularly extended from the outer sidewall said inner table at two sides of said first upright locating plates and said second upright locating plates, and a recessed hole formed on the outer sidewall of said inner table at the center of the space surrounded by said upright locating plates and said guide rods;

two angled stop plates, said angled stop plates each comprising a horizontal section inserted through one side hole of the axle holder of said inner table into the center through hole of said inner table and engaged into the annular retaining groove of said wheel axle to lock said inner table, and a vertical section disposed outside said inner table;

a substantially U-shaped spring wire rod stopped against said first upright locating plates at one side, said spring wire rod having two ends respectively fastened to the vertical section of each of said stop plates to force said stop plates into engagement with the annular retaining groove of said wheel axle to lock said inner table;

two driving arms respectively coupled to the pivot shafts of said inner table, said driving arms each having a center pivot hole, which receives the round rod of the corresponding pivot shaft of said inner table, a first end suspending in the top notch of one first upright locating plate of said inner table and a second end stopped at an inner side of the vertical section of one of said stop plates;

a press member inserted into the space between said first upright locating plates and said second upright locating plates, said press member comprising a dovetailed bottom block, said dovetailed bottom block having a recessed bottom hole, two oblique bottom guide grooves disposed at two sides of said dovetailed bottom block and respectively coupled to the first end of each of said driving arms, a top press face for pressing with the hand, and two protruded portions disposed at two sides;

a compression spring supporting said press member on said inner table, said compressing spring having one end press-fitted into the recessed bottom hole of the dovetailed bottom block of said press member and an opposite end positioned in the recessed hole of said inner table; and a wheel cover shaped like a cartoon Figure and fixedly fastened to said inner table, said wheel cover comprising a button hole, which receives said press member, two eyeholes bilaterally disposed near a top side thereof, two peripheral openings bilaterally disposed above said eyeholes, an arched slot disposed above said button hole, and a nose disposed between said eyeholes and said arched slot;

wherein when inserting said wheel axle into the center through hole of the center axle holder of said wheel rim and the center through hole of said inner table, said stop plates are pushed outwards in reversed directions against the spring power of said spring wire rod by the conical outer end of said wheel axle, and said stop plates are forced inwards by said spring wire rod to engage the annular retaining groove of said wheel axle after said wheel axle has been inserted into position; when pressing down said press member, said driving arms are forced by said press member to turn about the pivot shafts of said inner table reversely outwards from the axle holder of said inner table and to push said stop plates away from the annular retaining groove of said wheel axle, for enabling said inner table and said wheel rim to be removed from said wheel axle; said wheel cover does not move relative to said wheel rim and said outer tire when said wheel rim and said outer tire are rotated to move the vehicle.

2. The vehicle wheel of claim 1 further comprising:

an annular drive gear mounted in the circular center recess of said wheel rim around the center through hole of said wheel rim;

a driven gear mounted on the inner sidewall of said inner table and meshed with said drive gear;

a transmission gear train mounted on the outer sidewall of said inner table and driven by said driven gear, said transmission gear train comprising a first small gear synchronously rotated with said driven gear, a second small gear, and a big gear meshed between said first small gear and said second small gear, the gears of said transmission gear train each having an eccentric rod;

a first ornamental device, said first ornamental device comprising an elongated, vertically extended middle slot coupled to the eccentric rod of said big gear, two elongated, horizontally extended side slots respectively coupled to a respective stepped post of said inner table, and a back pin;

two second ornamental devices respectively pivoted to the outer sidewall of said inner table, said second ornamental devices each comprising a first pivot hole, a second pivot hole pivoted to said inner table, and an ear-like lug extending out of one of the peripheral openings of said wheel cover;

a third ornamental device hung on and turned about the axle holder of said inner table, said third ornamental device comprising a pivot hole disposed at one end thereof and coupled to the back pin of said first ornamental device, and a protruding rod disposed at an opposite end thereof and inserted through the arched slot of said wheel cover;

two links respectively coupled between said second ornamental devices and said small gears, said links each comprising a pivot hole disposed near one end and coupled to the eccentric rod of one of the small gears of said transmission gear train, and a pivot rod disposed near an opposite end and coupled to the first pivot hole of one of said second ornamental devices;

a fourth ornamental device shaped like the tongue of an animal and fixedly fastened to the protruding rod of said third ornamental device outside said wheel cover; and two eye-shaped stickers respectively adhered to said first ornamental device at locations corresponding to the eyeholes of said wheel cover.

* * * * *